United States Patent [19]

Moser

[11] Patent Number: 5,601,926
[45] Date of Patent: Feb. 11, 1997

[54] HEAT AND PRESSURE FUSER AND SILICONE/VITON FUSER ROLL THEREFOR

[75] Inventor: Rabin Moser, Victor, N.Y.

[73] Assignee: Xerox Corporation, Stamford, Conn.

[21] Appl. No.: 299,386

[22] Filed: Sep. 1, 1994

[51] Int. Cl.⁶ ........................................... B32B 9/04
[52] U.S. Cl. .................. 428/447; 428/358; 428/330; 428/411.1; 428/446; 428/457; 428/906; 492/53; 492/56
[58] Field of Search ............... 355/284; 492/53–56; 428/906, 446, 688, 35.8, 330, 411.1, 447, 476, 457

[56] References Cited

U.S. PATENT DOCUMENTS

| | | | |
|---|---|---|---|
| 4,078,286 | 3/1978 | Takiguichi et al. ................... | 29/132 |
| 4,257,699 | 3/1981 | Lentz ................................... | 355/3 FU |
| 5,017,432 | 5/1991 | Eddy et al. ........................... | 428/422 |
| 5,049,444 | 9/1991 | Bingham et al. ..................... | 428/339 |
| 5,061,965 | 10/1991 | Ferguson et al. ..................... | 355/284 |
| 5,141,788 | 8/1992 | Badesha et al. ...................... | 428/36.8 |
| 5,166,031 | 11/1992 | Badesha et al. ...................... | 430/124 |
| 5,217,837 | 6/1993 | Henry et al. ......................... | 430/124 |
| 5,219,612 | 6/1993 | Bingham et al. ..................... | 427/194 |
| 5,281,506 | 1/1994 | Badesha et al. ...................... | 430/124 |

*Primary Examiner*—William Krynski

[57] ABSTRACT

A long life heat and pressure roll fuser apparatus. The roll fuser apparatus is characterized by the provision of a heated fuser roll having a hard core with two discrete elastomeric layers thereon. The outer elastomeric layer is provided for its good toner release and copy quality properties. The other of the two elastomeric layer is selected for its high degree of resistance to wear due to paper edge contact.

10 Claims, 2 Drawing Sheets

HEAT AND PRESSURE FUSER AND SILICONE/VITON FUSER ROLL THEREFOR

BACKGROUND OF THE INVENTION

This invention relates generally to a heat and pressure fuser for an electrophotographic printing machine, and more particularly the invention is directed to a fuser roll structure that minimizes the effects of paper edge contact with an elastomeric surface.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In order to fix or fuse the toner material onto a support member permanently by heat, it is necessary to elevate the temperature of the toner material to a point at which constituents of the toner material coalesce and become tacky. This action causes the toner to flow to some extent onto the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the heated fuser roll to thereby effect heating of the toner images within the nip.

The heated fuser roll which is usually the roll that contacts the toner images on a substrate such as plain paper. In any event, the roll contacting the toner images must be provided with an abhesive material for preventing toner offset to the fuser member. Two materials which are commonly used for such purposes are Viton and silicone rubber.

Viton fuser rolls are susceptible to chemical degradation and hardening due to DDAMS and CPC in the toner. Silicone rubber does not have a similar problem. If a silicone material is used as the coating on the fuser roll its release and copy quality characteristics last a long time. However, paper path edge wear limits the useful life of rolls covered with silicone rubber. This is particularly true in machines that have more effective paper edge registration. Thus, paper edge wear varies appreciably from machine to machine depending upon the performance of the paper edge registration mechanism. As an example, it was found that in one machine using a silicone coated fuser roll that it was possible to fuse a million copies before the useful life of the fuser roll was exceeded. In another machine, edge wear limited useful life of the fuser roll to one hundred thousand copies.

Following is a discussion of prior art, incorporated herein by reference, which may bear on the patentability of the present invention. In addition to possibly having some relevance to the question of patentability, these references, together with the detailed description to follow, may provide a better understanding and appreciation of the present invention.

U.S. Pat. No. 5,281,506 granted on Jan. 25, 1994 discloses a method of making a fuser member having a polyorganosiloxane grafted onto a fluoroelastomer and method of fusing. A fuser member comprising a supporting substrate having an outer layer of a cured fluoroelastomer and having a thin surface layer of a polyorganosiloxane having been grafted to the surface of said cured fluoroelastomer in the presence of a dehydrofluorination agent for the fluoroelastomer and from a polyorganosiloxane having reactive functionality.

U.S. Pat. No. 5,219,612 issued on Jun. 15, 1993 discloses a method of using multilayered member for fusing thermoplastic resin toner images to a substrate in a fuser system of the type wherein a polymeric release agent having functional groups is applied to the surface of the fuser member. The multilayered fuser member has in sequential order a base support member, an abhesive layer comprising a copolymer of vinylidene fluoride and hexafluoropropylene and at least 20% by weight of the abhesive layer of a coupling agent comprising at least one organo functional silane and an activator, a tie coat layer of active ingredients comprising a copolymer of vinylidene fluoride and hexafluoropropylene and an outer elastomeric fusing surface comprising a copolymer of vinylidene fluoride and hexafluoropropylene and containing a metal oxide present in an amount sufficient to interact with a polymeric release agent having functional groups to provide an interfacial barrier layer between said fusing surface and toner.

U.S. Pat. No. 5,217,837 issued on Jun. 8, 1993 discloses a multilayered fuser member for fusing thermoplastic resin toner images to a substrate in a fuser system of the type wherein a polymeric release agent having functional groups is applied to the surface of the fuser member, the fuser member has a base support member, a thermally conductive silicone elastomer layer, an amino silane primer layer, an abhesive layer and an elastomer fusing surface comprising poly(vinylidenefluoride-hexafluoropropylene-tetrafluoroethylene) a metal oxide present in the fusing surface to interact with the polymeric release agent to provide an interfacial barrier layer between the fusing surface and the toner and substantially unreactive with the elastomer, the elastomer having been cured from a solvent solution with a nucleophilic curing agent soluble in the solution and in the presence of 4 parts by weight of inorganic base per 100 parts of polymer, the abhesive layer having been cured from a solvent solution of the above composition from which the fusing surface is cured and from about 5 to about 10% by weight of a coupling agent.

U.S. Pat. No. 5,166,031 issued on Nov. 24, 1992 discloses a fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

U.S. Pat. No. 5,141,788 issued on Aug. 25, 1992 discloses a fuser member comprising a supporting substrate having an outer layer of a cured fluoroelastomer and having a thin surface layer of a polyorganosiloxane having been grafted to the surface of said cured fluoroelastomer in the presence of a dehydrofluorination agent for the fluoroelastomer and from a polyorganosiloxane having reactive functionality. The outer layer of a polyorganosiloxane unlike the invention disclosed herein is not a discrete or continuous layer.

U.S. Pat. No. 5,061,965 issued on Oct. 29, 1991 discloses a release agent donor member for a toner fixing system wherein a polymeric release agent having functional groups is applied to the surface of a fuser member has a base member, an intermediate conformable silicone elastomer layer and an elastomer release agent donor layer comprising poly(vinylidenefluoride-hexafluoropropylenetetrafluoroethylene) where the vinylidenefluoride is present in an amount less than 40 mole percent, a metal oxide present in an amount sufficient to interact with the polymeric release agent having functional groups to transport a sufficient amount of the polymeric release agent to provide an interfacial barrier layer between the fusing surface parts by weight of inorganic base per 100 parts of polymer, the inorganic base being effective to at least partially dehydrofluorinate the vinylidenefluoride.

U.S. Pat. No. 5,049,444 issued on Sep. 17, 1991 discloses a multilayered member for fusing thermoplastic resin toner images to a substrate in a fuser system of the type wherein a polymeric release agent having functional groups is applied to the surface of the fuser member. The multilayered fuser member has in sequential order a base support member, an abhesive layer comprising a copolymer of vinylidene fluoride and hexafluoropropylene and at least 20% by weight of the abhesive layer of a coupling agent comprising at least one organo functional silaneand an activator, a tie coat layer of active ingredients comprising a copolymer of vinylidene fluoride and hexafluoropropylene and an outer elastomeric fusing surface comprising a copolymer of vinylidene fluoride and hexafluoropropylene and containing a metal oxide present in an amount sufficient to interact with a polymeric release agent having functional groups to provide an interfacial barrier layer between said fusing surface and toner.

U.S. Pat. No. 5,017,432 issued on May 21, 1991 discloses a fuser member and fuser system of a type wherein a polymeric release agent having functional groups supplied to the surface of the fuser member has an elastomer fusing surface comprising poly(vinylidenefluoride-hexafluoropropylene-tetrafluoroethylene) wherein the vinylidenefluoride is present in the amount less than 40 mole percent, a metal oxide is present in amounts sufficient to interact with the polymer release agent having functional groups to provide an interfacial barrier layer between the fusing surface and the toner and being substantially unreactive with the elastomer and wherein the elastomer is cured from a solvent solution thereof with a nucleophilic curing agent soluble in the solution and in the presence of less than 4 parts by weight of inorganic base per 100 parts by weight of polymer with the inorganic base being effective to at least partially dehydrofluorinate the vinylidenefluoride.

U.S. Pat. No. 4,257,699 issued on Mar. 24, 1981 discloses afuser member, fuser assembly and method of fusing or fixing thermoplastic resin powder images to a substrate in a fuser assembly of the type wherein a polymeric release agent having functional groups is applied to the surface of the fuser member is disclosed. The fuser member comprises a base member having at least two layers of elastomer thereon, at least the outer layer elastomer surface having a metal-containing filler therein. Exemplary of such a fuser member is an aluminum base member coated with a first layer of poly(vinylidene fluoride-hexafluoropropylene) copolymer optionally having a metal-containing filler, such as lead oxide, dispersed therein and at least a second layer of poly(vinylidene fluoride-hexafluoropropylene) copolymer having metal-containing filler, such as lead oxide, dispersed therein coated upon said first layer.

U.S. Pat. No. 4,078,286 issued on Mar. 14, 1978 discloses silicone rubber employed as an outer coating material on a fuser member and is applied to the base member by means of a novel construction which prevents the separation of the outer silicone rubber coating from the roll even when silicone oil is applied thereto. The fuser member comprises a base member, a layer of a heat-resistant resin formed on the base member and a layer of a silicone rubber formed on the heat-resistant resin layer, the silicone rubber being vulcanized after the formation of the layer of silicone rubber on the resin layer. A primer layer may be used between the heat-resistant resin layer and the silicone rubber layer.

BRIEF SUMMARY OF THE INVENTION

In accordance the present invention, a multi-layered fuser roll is provided wherein the layer that contacts the toner images to be fused exhibits superior release and copy quality characteristics but not the desired wear resistance properties. Another layer which is disposed between the toner image contacting layer and the hard core of the fuser roll possesses superior wear resistance properties. Such a combination of materials provides a fuser roll structure having a considerably longer life than a silicone rubber roll yet it has the desired release and copy quality characteristics.

When the outer layer of fuser roll disclosed herein is worn through thereby exposing the wear resistant layer performance of the fuser roller remains unaffected and the desired longer life is not compromised. This because the toner images are still contacted by a material exhibiting the desired release and copy quality properties and at this time, the presence of the wear resistant material retards the edge wear phenomena. The wear resistant material also provides the conformability required for acceptable fuser operation.

Other features of the present invention will become apparent as the following description proceeds and upon reference to the drawings, in which:

While the present invention will be described in connection with a tri-level printing, it will be understood that it is not intended to limit the invention to that type of printing. On the contrary, it is intended to cover all alternatives, modifications, and equivalents as may be included within the spirit and scope of the invention as defined by the appended claims.

DETAILED DESCRIPTION OF THE PREFERRED EMBODIMENT OF THE INVENTION

Figure 1:
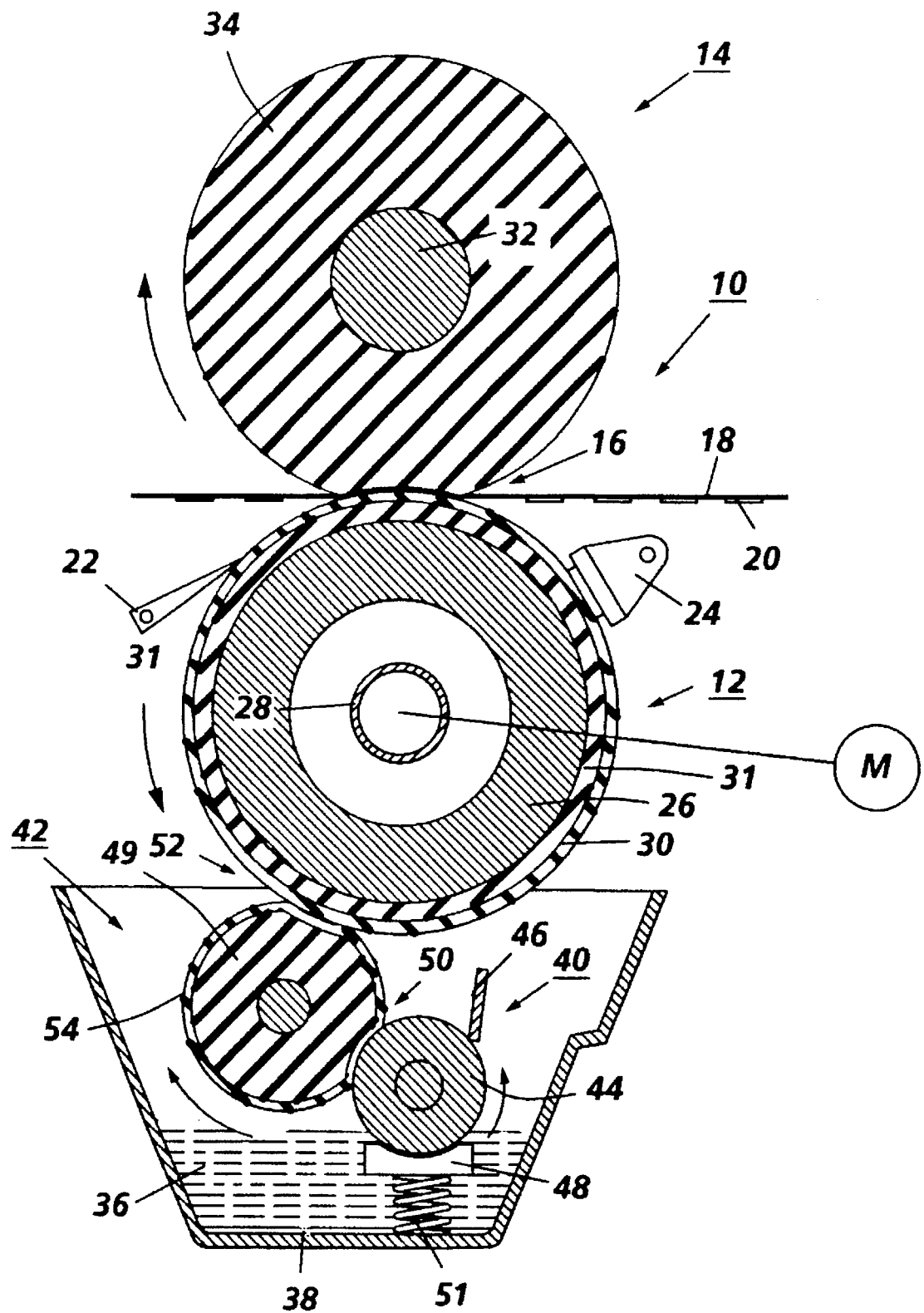
FIG. 1 is a schematic representation of a heat and pressure fuser incorporating the invention.
Figure 2:
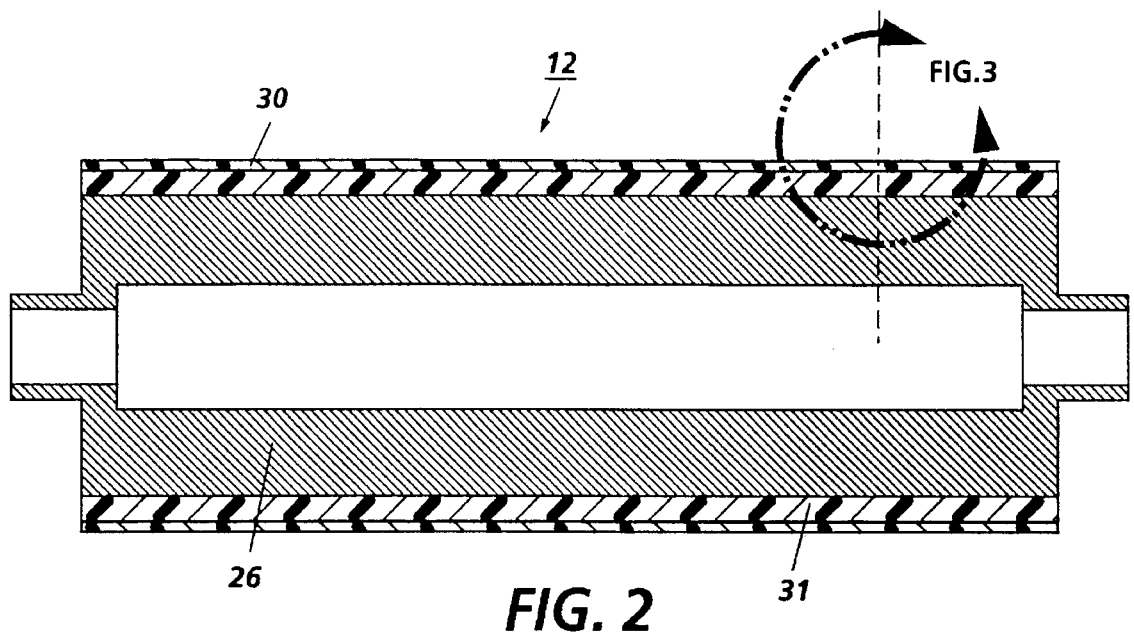
FIG. 2 is a is plan view of a fuser roll structure incorporating the novel arrangement of discrete layers of materials according to the present invention.
Figure 3:
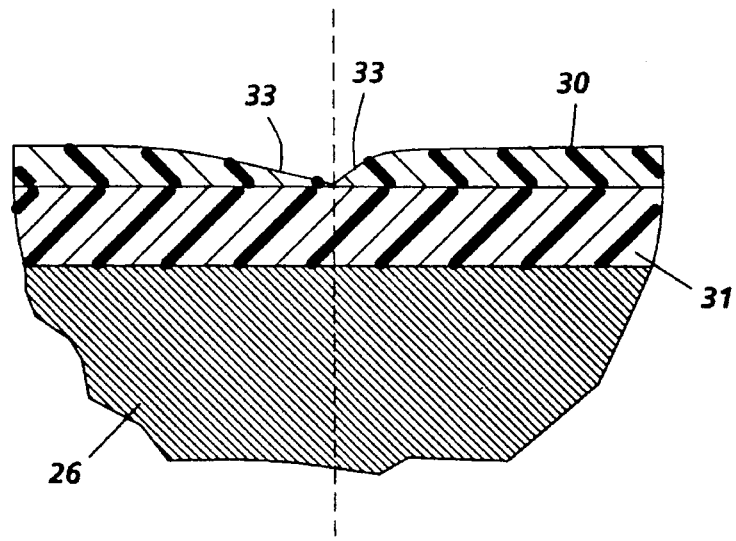
FIG. 3 is an enlarged fragmentary view of showing the state of the material layers once a top layer has been worn due to paper edge contact.

FIG. 3 discloses a heat and pressure fuser of the prior art generally indicated by reference character 10. The fuser apparatus comprises a heated roll structure 12 cooperating with a non-heated backup roll structure 14 to form a nip 16 through which a copy substrate 18 passes with toner images 20 formed thereon in a well known manner. The toner images 20 contact the heated roll structure while a force is applied between the roll structures in a well known manner to create pressure therebetween resulting in the deformation of the backup roll structure by the heated roll structure to thereby form the nip 16.

As the substrate passes out of the nip, it is stripped from the heated roll structure by a plurality (only one shown) of air stripping devices 22 after which it is free to move along a predetermined path toward the exit of the machine (not shown) in which the fuser apparatus 10 is to be utilized.

A contact temperature sensor 24 is provided for sensing the surface temperature of the roll structure 12 and in conjunction with conventional circuitry (not shown) maintains the surface temperature to a predetermined value, for example, on the order of 375°–400° F.

The heated roll structure 12 comprises a core or hollow cylinder or core 26 having a radiant quartz heater 28 disposed in the hollow thereof. When suitably energized via the aforementioned circuitry, the heating element radiates heat to the cylinder which is then conducted to the outer surface of an outer layer 30 of the structure 12 which preferably comprises silicone rubber having a thickness of 0.003 in. An inner layer 31 which is adhered to the core 26 and the outer layer 30 comprises Viton (trademark of E.I. du Pont Nemours & Co. for a fluoroelastomer based on the copolymer of vinylidene fluoride and hexafluoropropylene). A typical thickness for inner layer 31 is about 0.008 inch. According to the present invention, the fuser roll or heated roll structure 12 comprises discrete layers of elastomeric material which can be adhered to each other by various techniques known in the prior art. The two-layer arrangement is, in turn, adhered to the core 26 in any suitable manner. The silicone rubber provides superior toner release and copy quality properties while the Viton provides superior wear resistance characteristics which retards material wear do to contact with the copy paper edge.

In operation, the silicone rubber is worn away as indicated by reference character 33 (FIG. 3) due to the contact with the paper edges. Once this degree of wear of the silicone rubber occurs, the paper edges then contact the Viton material. The Viton exhibits a high degree of wear resistance due to contact with paper edges. Thus, the rate of wear is greatly reduced compared to a fuser roll where only silicone rubber is used. Also, toner release and copy quality are superior to that obtained when using only Viton as the toner contacting material. It will be appreciated that release in the area of wear is not so critical since toner particles are at a minimum in that area.

The backup roll structure 14 comprises a solid metal core 32 to which is adhered a relatively thick layer 34 of deformable material for example an elastomer known as ethylene-propylene terpolymer which is based on stereosperific linear terpolymers of ethylene, propylene and small amounts of non-conjugated diene which is commonly referred to as EPDM which layer carries a thin overcoat of PFA. Due to the construction of the backup roll structure it is deformed by the harder heated roll structure when the required pressure is applied therebetween, the pressure being a function of the desired deformation which corresponds to the desired length of the nip 16.

While the layer 30 tends to be abhesive, therefore, exhibits a low affinity for the toner material 20, it has been found desirable to coat the layer with a release agent material 36 contained in a sump 38. The material 36 comprises a polymeric release agent having functional groups such as carboxy, hydroxy, epoxy, ammo, isogenate, thioether or mercapto groups.

For the purpose of coating the heated roll structure 12 there is provided a release agent applying mechanism generally indicated 40. The mechanism 40 comprises a donor roll 42, metering roll 44, doctor blade 46 and a wick 48.

The metering roll 44 is partially immersed in the release agent material 36 and is supported for rotation such that it is contacted by the donor roll 42 which, in turn, is supported so as to be contacted by the heated roll structure 12. As can be seen, the orientation of the rolls 42 and 44 is such as to provide a path for conveying material 36 from the sump to the surface of the heated roll structure 12. The metering roll is preferably a steel-surfaced roll having a 4-32 AA finish. The metering roll has an outside diameter of 0.75 inch. As mentioned above, the metering roll is supported for rotation, such rotation being derived by means of the positively driven heated roll structure 12 via the rotatably supported donor roll 42. In order to permit rotation of (at a practical input torque to the heated roll structure 12) of the metering roll 44 in this manner the donor roll 42 comprises a deformable layer 4) which forms a first nip 50 between the metering roll and the donor roll and a second nip 52 between the latter and the heated roll. The nips 50 and 52 also permit satisfactory release agent transfer between the rolls and roll structure. Suitable nip lengths are 0.10 inch.

A wick 48 is fully immersed in the release agent and contacts the surface of the metering roll 44. The purpose of the wick is to provide an air seal which disturbs the air layer formed at the surface of the roll 44 during rotation thereof. If it were not for the function of the wick, the air layer would be coextensive with the surface of the roll immersed in the release agent thereby precluding contact between the metering roll and the release agent.

The wiper blade 46 preferably fabricated from Viton is ¾×⅛ in cross section and has a length coextensive with the metering roll. The edge of the blade contacting the metering roll has a radius of 0.001–0.010 inch. The blade functions to meter the release agent picked up by the roll 44 to a predetermined thickness, such thickness being of such a magnitude as to result in several microliters of release agent consumption per copy. The donor roll 42 has an outside diameter of 0.813 inch when the metering roll's outside diameter equals 0.75 inch. It will be appreciated that other dimensional combinations will yield satisfactory results. For example, 1.5 inch diameter rolls for the donor and metering rolls have been employed. The deformable layer 49 of the donor roll preferably comprises silicone rubber. However, other materials may also be employed.

A thin sleeve 54 on the order of several mils, constitutes the outermost surface of the roll 42, the sleeve material comprises Teflon. While the donor rolls may be employed without the sleeve 54, it has been found that when the sleeve is utilized, contaminants such as lint on the heated roll 12 will not readily transfer to the metering roll 44. Accordingly, the material in the sump will not become contaminated by such contaminants.

I claim:

1. A multilayered fuser member for fusing thermoplastic resin toner images to a substrate in a fuser apparatus of the type wherein a polymeric release agent is applied to the surface of the fuser member, said fuser member comprising:

a core member;

a first layer of a material having good wear resistance, said first layer being adhered to said core member; and a second layer of material having good toner release and copy quality properties, said second layer being adhered to said first layer and forming an outermost layer of said fuser member, said second layer comprising silicone rubber.

2. The fuser member according to claim 1 wherein said first layer comprises a fluoroelastomer.

3. Heat and pressure fuser apparatus comprising:

a heated fuser member;

a pressure member cooperating with said fuser member to form a nip through which substrates with toner images thereon pass with the toner images contacting said heated fuser member;

a core member;

a first layer of a material having good wear resistance, said first layer being adhered to said core member; and a second layer of material having good toner release and copy quality properties, said second layer being adhered to said first layer and forming an outermost layer of said fuser member, said second layer comprising silicone rubber.

4. Apparatus according to claim 3 wherein said first layer comprises a fluoroelastomer.

5. Apparatus according to claim 4 wherein said second discrete layer has a thickness equal to about 0.003 inch.

6. Apparatus according to claim 5 wherein said first layer has a thickness equal to about 0.008 inch.

7. Apparatus according to claim 6 wherein said core member is a cylindrical sleeve.

8. A multilayered fuser member for fusing thermoplastic resin toner images to a substrate in a fuser apparatus of the type wherein a polymeric release agent is applied to the surface of the fuser member, said fuser member comprising:

a core member;

a first layer of a material having good wear resistance, said first layer being adhered to said core member and comprising a fluoroelastomer; and a second layer of material having good toner release and copy quality properties, said second layer being adhered to said first layer and forming an outermost layer of said fuser member, said second layer comprising silicone rubber having a thickness of about 0.003 inch.

9. Apparatus according to claim 8 wherein said first layer has a thickness of about 0.008 inch.

10. The fuser member according to claim 9 wherein said core member is a cylindrical sleeve.

\* \* \* \* \*